United States Patent
Murofushi et al.

(10) Patent No.: US 6,194,564 B1
(45) Date of Patent: *Feb. 27, 2001

(54) PROCESS FOR PRODUCTION OF SALINE-SOLUTION SOLUBLE XANTHAN GUM

(75) Inventors: Kanji Murofushi, Jyoetsu; Shigehiro Nagura, Kubiki-mura, both of (JP)

(73) Assignees: Shin-Etsu Chemical Co., Ltd., Tokyo (JP); Shin-Etsu Bio, Inc., San Diego, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/136,341

(22) Filed: Aug. 19, 1998

Related U.S. Application Data (62) Division of application No. 08/598,645, filed on Feb. 6, 1996.
(60) Provisional application No. 60/000,870, filed on Jul. 11, 1995.

(30) Foreign Application Priority Data

Jul. 11, 1995 (JP) ................................... 7-174713

(51) Int. Cl.[7] ........................... C08B 37/00; B02C 7/00; B02C 9/00; B02C 17/00; B01D 35/00
(52) U.S. Cl. ................... 536/114; 536/123; 536/123.1; 536/124; 210/174; 241/24.11; 241/69; 241/91; 241/167
(58) Field of Search ................ 536/114, 123, 536/123.1, 124; 210/174; 241/24.11, 69, 91, 167

(56) References Cited

U.S. PATENT DOCUMENTS

| | | | |
|---|---|---|---|
| 4,321,140 | * 3/1982 | Luthi | 210/327 |
| 4,511,559 | * 4/1985 | Szendrei et al. | 514/54 |
| 5,416,206 | 5/1995 | Nagura et al. | 536/114 |

OTHER PUBLICATIONS

Database XP 002023564—Derwent Publication AN–94–040055 & JP–A–05 345 801.

* cited by examiner

*Primary Examiner*—Gary Geist
*Assistant Examiner*—Everett White
(74) *Attorney, Agent, or Firm*—Reed Smith LLP (57) ABSTRACT

A process for saline-solution soluble xanthan gum which comprises the steps of precipitating xanthan gum by mixing, with stirring, an aqueous solution of xanthan gum with an organic solvent which is a non-solvent to xanthan gum but is hydrophilic, removing liquid from the precipitated xanthan gum to a liquid content of at most 50%, disintegrating the cake of xanthan gum after the liquid removal to an average grain size of from 0.3 to 2 cm in diameter, and drying the disintegrated xanthan gum by fluidizing the same at a temperature not exceeding 80° C.

1 Claim, 6 Drawing Sheets

PROCESS FOR PRODUCTION OF SALINE-SOLUTION SOLUBLE XANTHAN GUM

CROSS-REFERENCE TO RELATED APPLICATIONS

This application is a divisional application of Application Ser. No. 08/598,645 filed Feb. 6, 1996.

The priority of prior copending provisional application Ser. No. 60/000,870, filed Jul. 11, 1995, is claimed.

BACKGROUND OF THE INVENTION

The present invention relates to a process for modifying xanthan gum to obtain a xanthan gum having enhanced solubility in saline solution.

Xanthan gum is a naturally occurring high molecular weight polysaccharide and has found a wide scope of uses, particularly as a thickener or viscosity modifier for aqueous based compositions. For example, it has found extensive use in the food, cosmetic and oil industries. The ability of xanthan gum to effectively modify an aqueous solution is directly related to its solubility in the aqueous medium. Since in such uses, the aqueous compositions generally contain sodium chloride or other salts, it is desired that the xanthan gum have as high a solubility in such salt solutions as possible. However, xanthan gum which is conventionally obtained from the fermentation of *Xanthomonas campestris* does not exhibit a particularly high solubility in saline solution, and in particular, saline solutions having relatively high salt concentrations.

A process for obtaining a modified xanthan gum which exhibits enhanced solubility in aqueous solutions of salts, such as, sodium chloride, is disclosed in U.S. Pat. No. 5,416,206. As described therein, and as referred to herein, enhanced solubility means that the xanthan gum exhibits a viscosity of not less than 800 mPa as determined on a 0.5% by weight solution thereof in a 12% by weight aqueous sodium chloride solution at 20° C. at 30 rpm using a Brookfield BL viscometer and having a ratio of this viscosity to that determined on a 0.5% by weight solution thereof in distilled water of not less than 1.5.

This process requires equipment for forming fine fibers of the precipitate while mixing an aqueous solution of xanthan gum with an organic solvent which is a non-solvent to xanthan gum but is hydrophilic. Japanese Patent Provisional Publication Nos. Sho 58-5301(5301/1983) and Hei 1-318001(318001/1989) teach a method for drying xanthan gum directly as precipitated in the form of lumps rather than fine fibers. The dried lumps, despite subsequent grinding, give products sometimes with unfavorably affected properties, such as, low solubility in aqueous saline solutions and other salts. In view of this, there has been need for a way of obtaining xanthan gum of good quality even through the conventional precipitation process.

SUMMARY OF THE INVENTION

Accordingly, it is an object of the present invention to provide a process for preparing xanthan gum having improved solubility in saline solution. Another object is to produce the saline soluble xanthan gum with decreased energy costs.

The above object of the present invention can be accomplished by providing a process for saline-solution soluble xanthan gum which comprises the steps of precipitating xanthan gum by mixing, with stirring, an aqueous solution of xanthan gum with an organic solvent which is a non-solvent to xanthan gum but is hydrophilic, removing liquid from the precipitated xanthan gum to produce a xanthan gum cake having a liquid content of at most 50%, disintegrating the cake of xanthan gum after the liquid removal into particles having an average size of from 0.3 to 2 cm, and preferably, from about 0.6 to 1.5 cm in diameter, and drying the particles of xanthan gum at a temperature not exceeding 80° C.

According to the present invention, the cake of precipitated xanthan gum is broken into particles by conventional means so that specially designed equipment is not required. The drying can be concluded within a short time period while the xanthan gum is maintained substantially in the particulate state, whereby a xanthan gum exhibiting excellent solubility in saline is obtained.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DETAILED DESCRIPTION OF THE PREFERRED EMBODIMENTS

Fermentation Step

The present invention in its practice may use an aqueous solution of xanthan gum, e.g., a fermentation broth containing dissolved xanthan gum as produced by the fermentation of, for example, *Xanthomonas campestris*, and a solution obtained by dissolving xanthan gum which has been previously precipitated and separated and/or processed, e.g., subjected to clarification treatments, and the like, in an aqueous solution.

Xanthan gum is prepared by well-known fermentation processes. For instance, it is produced by placing a bacterium belonging to the genus Xanthomonas, i.e., *X. campestris*, under appropriate fermentation conditions. (This compound and the process for producing the same are described in U.S. Pat. No. 3,659,026, the contents of which are incorporated herein by reference.)

In producing xanthan gum, *Xanthomonas campestris* as a xanthan gum-producing microorganism may be replaced by any other known Xanthomonas species. Examples are *X. carotate, X. incaniae, X. begonias, X. papavericola, X. translucens, X. vasculorum,* and *X. hederae*.

Precipitation Step

The xanthan gum to which the present invention applies is prepared conventionally by preliminary fermentation and main fermentation of a xanthan gum-producing bacterium on a suitable culture medium. It is usually obtained as a xanthan gum fermentation broth.

In the practice of the invention, the fermented solution is sterilized (heat treated), and the resulting aqueous xanthan gum solution is mixed with an organic solvent which is a non-solvent to xanthan gum but is hydrophilic by feeding them together to a tank equipped with agitating blades capable of high-speed agitation and mixing. The agitation-mixing in the tank causes precipitation of xanthan gum.

For the efficient mixing of a highly viscous aqueous xanthan gum and a hydrophilic organic solvent and also for the satisfactory recovery of the precipitated xanthan gum, the use of an agitation system that involves high-speed reciprocating motion of the blades is recommended. Ordinary agitation using one-way revolution allows precipitating xanthan gum to stick to the blades and often the precipitate is difficult to recover. The blade diameter/tank diameter ratio is desirably 0.5 or more. If the ratio is less than 0.5, stagnant regions develop along the inner walls of the tank, where the aqueous solution of xanthan gum and the hydrophilic organic solvent become immiscible.

The xanthan gum to be handled under the present invention is not specially limited. The invention can be used for any fermented solutions or broths of xanthan gum with or without subsequent filtration or treatment with chemicals or the like, and aqueous solutions in which previously recovered xanthan gum has been redissolved. Also, the composition of the aqueous solution, as well as its xanthan gum concentration, ph, temperature, and concentrations of other additives are not limited.

The hydrophilic organic solvent incapable of dissolving xanthan gum that is used in precipitating xanthan gum may be an alcohol such as methanol, ethanol or isopropanol, or dioxane, acetone, tetrahydrofuran or the like.

Liquid Removal Step

The xanthan gum precipitated by the process, at this stage contains at least about 80% by weight liquid. Drying the precipitate in this state adds substantially to the energy cost and requires high temperature and much time. Moreover, it is prone to overdrying, which undesirably affects the solubility of the xanthan gum in saline solutions. To avoid these, it is important to remove liquid from the xanthan gum to reduce its liquid content to 50% or less.

In the liquid removal step where the present invention is embodied, a dispersion containing precipitated xanthan gum is fed to a V-type disk press having a pair of revolving disk-shaped screens, the space between which decreases as the screens revolve. The xanthan gum dispersion is thus squeezed by the pair of disk-shaped screens, and its liquid content pressed out through the screens and recovered, while the xanthan gum is compressed into a cake which revolves with the screens until it is discharged for recovery.

Disintegration Step

The xanthan gum cake after the liquid removal takes the form of small lumps or long cords. This precipitate can retain interior regions of high-liquid-content regions. To completely dry the xanthan gum in this form would require elevated temperatures and long drying times, which, in turn, adversely affects the saline-solution solubility of the product. In accordance with the present invention, the xanthan gum cake obtained is broken or disintegrated into small grains or particles, which allows for the drying to be carried out at a sufficiently low temperature so as not to adversely affect the saline solubility of the product.

The disintegration method is not specially limited, but in the practice of the invention the use of a cutter provided with a screen is desirable. The average grain diameter of the xanthan gum thus broken out is preferably between 0.3 and 2 cm, and more preferably between 0.6 and 1.5 cm. A diameter larger than 2 cm is not recommended because it necessitates a high temperature treatment to dry up the interior of the xanthan gum grains. On the other hand, breaking down the cake into finer pieces of less than 0.3 cm in diameter is also undesirable since it can cause screen clogging or other problems which lead to reduced productivity.

Drying Step

The xanthan gum disintegrated by the afore-described method is dried at a temperature not higher than 80° C. The drying method is not specially restricted but a system of the type that fluidizes the xanthan gum grains during the process of drying is desirable. The drying temperature should not exceed 80° C. Otherwise, the saline- solution solubility of the product will be undesirably decreased.

Grinding Step

In practicing the invention, it is possible to grind the dried xanthan gum to a sufficiently fine size to facilitate the dispersion in saline solutions. The grinding method may be any of the methods in common use, e.g., impact grinding.

The invention will now be described in more detail with reference to the accompanying drawings showing a preferred embodiment thereof.

Figure 1:
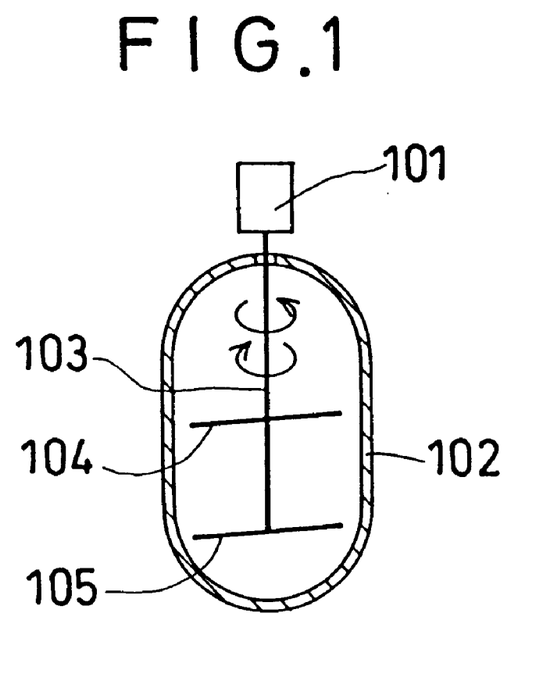
FIG. 1 is a schematic view illustrating a stirred tank for use in the present invention.

FIG. 1 illustrates a preferred form of tank for use in the precipitation step according to this invention. In FIG. 1, numeral 101 indicates drives including a motor for driving an agitator shaft, 102 indicates a stirred tank, and 103 indicates the agitator shaft 103. Agitator shaft 103 is provided with upper and lower agitating blades 104 and 105, which, in opposing pairs, extend from agitator shaft 103 in the left and right directions as viewed in this figure. In the embodiment being described, each pair of agitating blades 104 or 105 has longitudinal axes on the same plane. Agitating blades 104 and 105 are triangular in cross section and are each tapered.

The number and cross sectional contour of agitating blades 104 and 105 are not limited to those embodied here but any other number and/or contour may be adopted unless it departs from the purposes of the invention.

Agitating blades 104 and 105 are capable of stirring and mixing at high speeds, turning back and forth at every quarter of a revolution. Ordinary agitation that involves one-way blade revolution often causes the precipitated xanthan gum to stick so fast to the blades that it can hardly be recovered. The above-mentioned reciprocating motion can be produced by a known mechanism for the transmission of rotation from the drive motor to the agitator shaft 103. It is, of course, possible to control the drives with the provision of microprocessor-based controls so as to effect such reciprocating motion.

The blade diameter/tank diameter ratio is desirably 0.5 or upwards. A ratio of less than 0.5 is undesirable because it forms a stagnant region close to the inner wall of tank 102, where an aqueous solution of xanthan gum and a hydrophilic organic solvent cannot be mixed. The tank is supplied with an organic solvent (isopropanol) which is a non-solvent to xanthan gum but is hydrophilic and an aqueous solution of xanthan gum. Mixing them with stirring in the tank permits the precipitation of xanthan gum. After the precipitation procedure, a dispersion containing the precipitated xanthan gum is fed to a V-type disk press shown in FIGS. 2 and 3.

Figure 2:
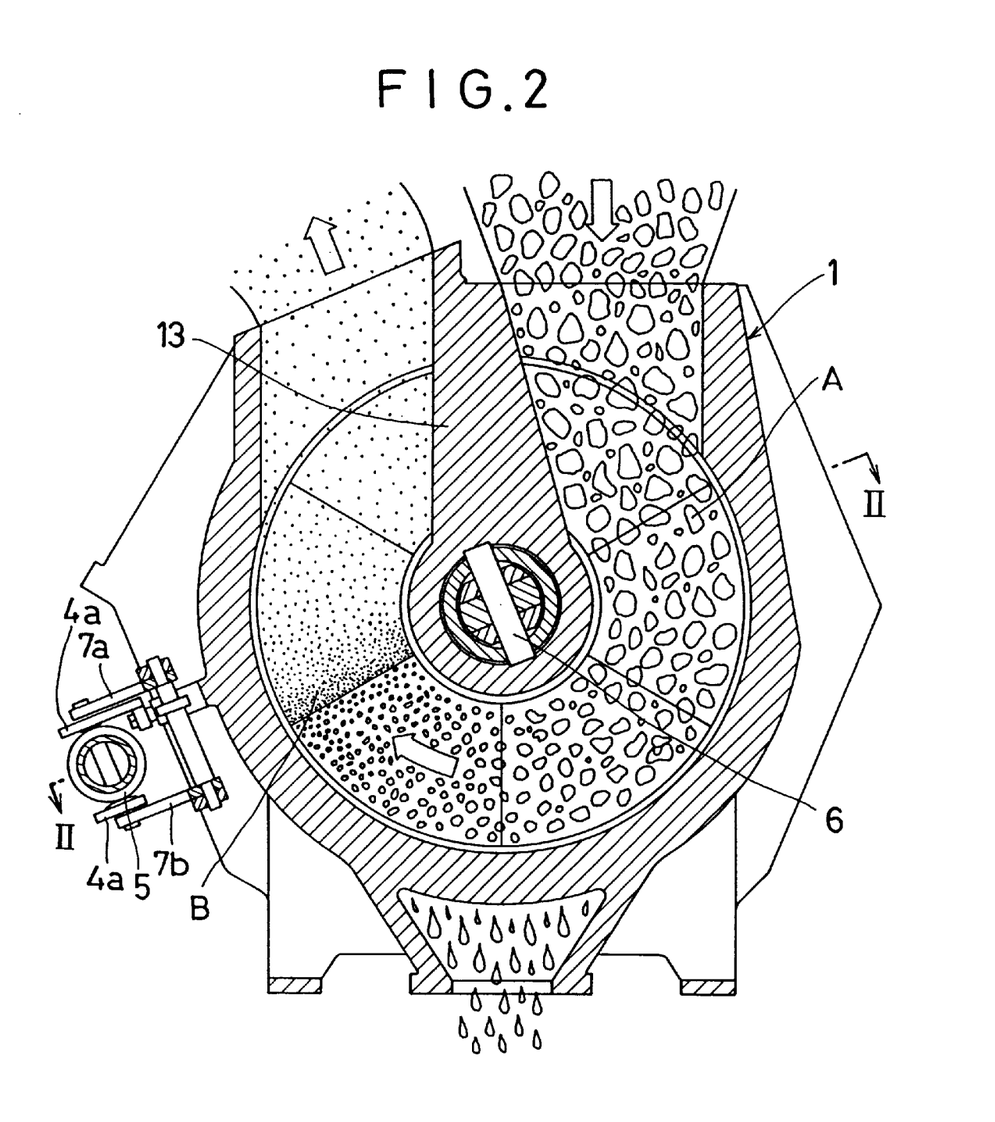
FIG. 2 is a sectional view illustrating essential parts of a V-type disk press for use in the invention.
Figure 3:
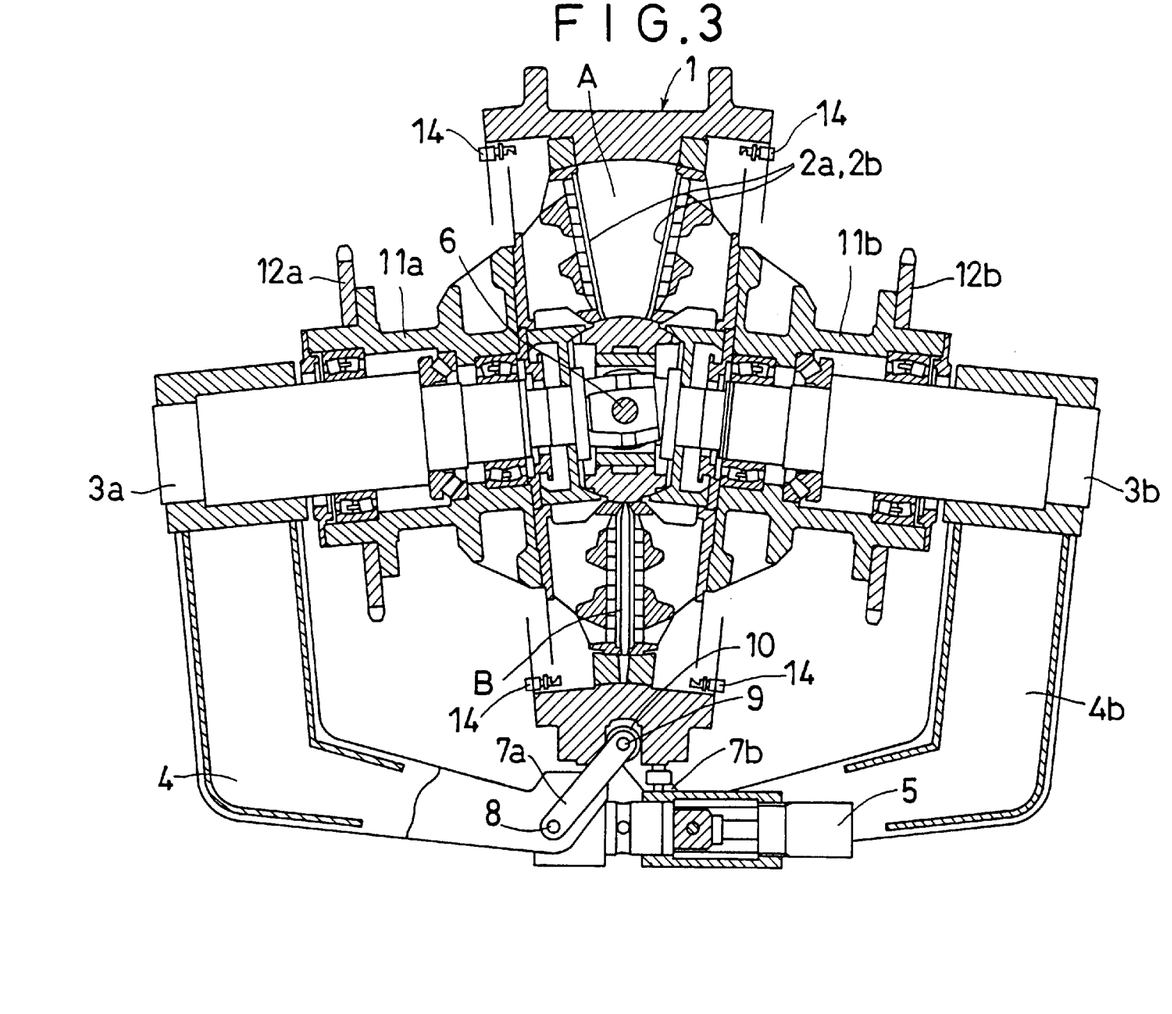
FIG. 3 is a sectional view taken along line II—II in FIG. 2.

FIGS. 2 and 3 illustrate a preferred form of the V-type disk press for use in the liquid removal step (referred to herein as a "V-type disk press"). In these figures, reference numeral 1 indicates the main body of the V-type disk press, 2a and 2b are screens, 3a and 3b are spindles, 4a and 4b are supporting arms, and 5 is a hydraulic cylinder (or spring-loaded cylinder).

Figure 4:
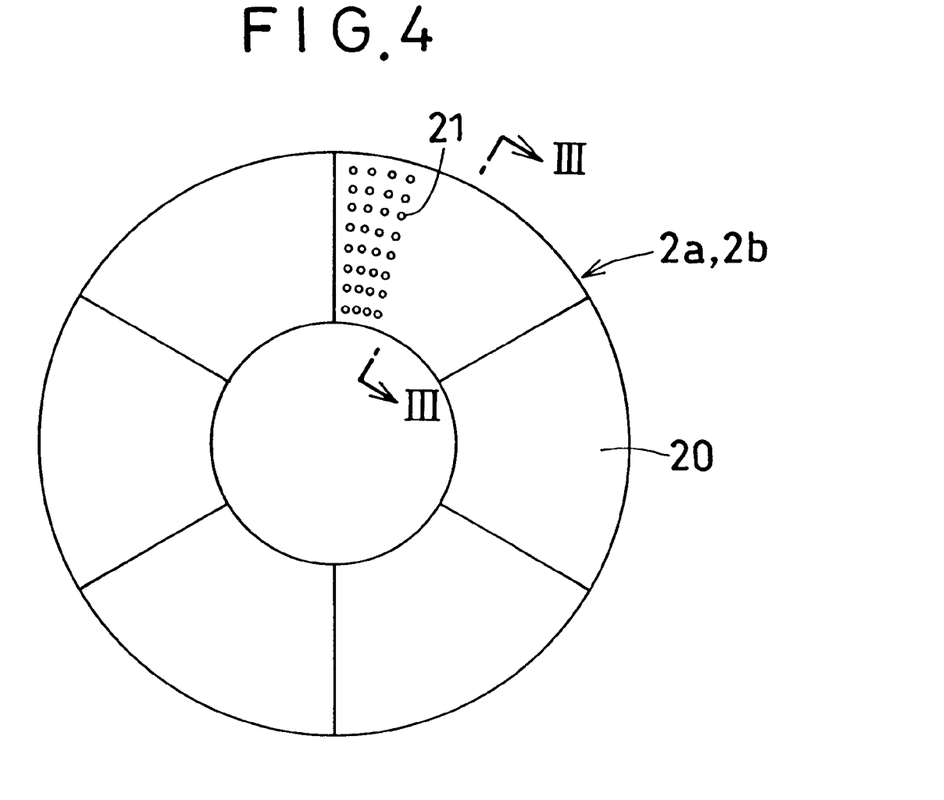
FIG. 4 is a front view of either screen 2a or 2b.
Figure 5:
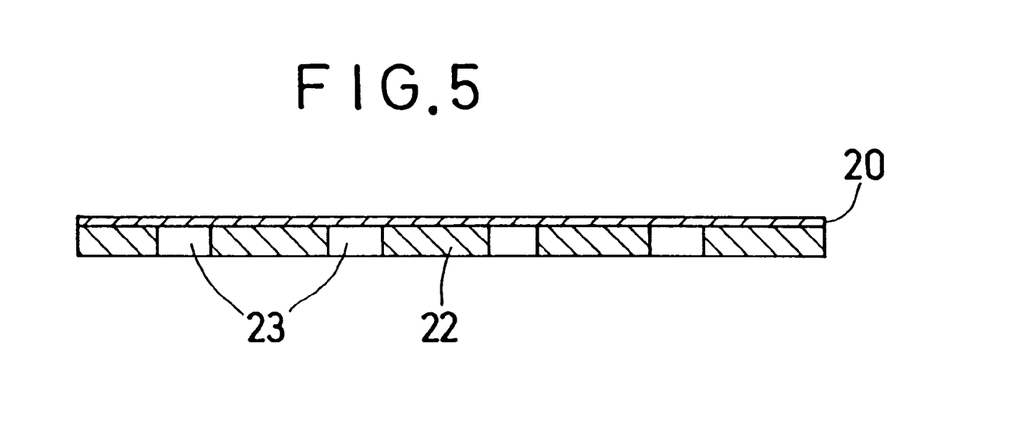
FIG. 5 is a sectional view taken along line III—III in FIG. 4.

The pair of screens 2a and 2b, as can be seen, are disk-shaped (or conical) and fixed to rotating supports 11a and 11b. The space between screens 2a and 2b is the widest on the raw material inlet side A and the narrowest on the opposite side B that is 180 degrees apart. Screens 2a and 2b are divided into 6 segments each when viewed from the front as in FIG. 4. Each segment consists of a punched metal plate 20 in which a large number of small openings 21 are made evenly throughout. Its relative open area is governed by the size (of the screen mesh) and number of the small openings 21. The punched metal plate 20 is suitably strengthened on the rear side by a reinforcing plate 22 to withstand the pressures during pressing (FIG. 5). The reinforcing plate 22 has larger, uniformly spaced openings 23.

In this embodiment, the size of the individual small openings (of the screen mesh) is desirably not greater than 1 $mm^2$, and screens having circular or slit-like openings are used. Meshes greater than 1 $mm^2$ are not desired because of large loss of xanthan gum through the screens upon pressing. As FIG. 3 shows, the spindles 3a and 3b are disposed in a pair, on the left and right, fixedly supported by supporting arms 4a and 4b, respectively, and connected rockably relative to each other by a center pin 6 at the center of main body 1. Center pin 6 is fixed at both ends to main body 1. Supporting arms 4a and 4b are L-shaped and fixedly support spindles 3a and 3b at one end in the manner described above and are connected to each other at the other end through hydraulic cylinder 5 or a spring-loaded cylinder. In the neighborhood of hydraulic cylinder 5, supporting arms 4a and 4b are displaceably connected to the main body with links 7a and 7b, respectively. Numeral 8 designates a pivot for link 7a and supporting arm 4a, and 9 designates a pivot for links 7a and 7b. Of course, this mechanism includes a pivot for link 7b and supporting arm 4b but it cannot be seen in FIG. 3. Pivot 9 can slide up and down within a recess 10 (thus constituting a slider).

A combination of main body 1, center pin 6, supporting arm 4a integral with spindle 3a, pivot 8, link 7a, pivot 9, and recess 10 forms revolving slider crank mechanism. Similarly, main body 1, center pin 6, supporting arm 4b integral with spindle 3b, pivot 8, link 7b, pivot 9, and recess 10 combinedly form a revolving slider crank mechanism. Owing to these mechanisms, it is made possible, by regulating the opening angle of links 7a and 7b through the lateral movement of hydraulic cylinder 5 or spring-loaded cylinder, to adjust the angle between spindles 3a and 3b cooperating with those elements and thereby control the degree of opening of screens 2a and 2b and hence the pressing force.

While revolving slider cranks are used in this embodiment as mechanisms for regulating the degree of opening of the screens, any other mechanism capable of regulating the spindle angle may be employed instead under the invention, such as quadric crank chains in which the sliders are replaced by links.

As shown in FIG. 3, rotating supports 11a and 11b are rotatably supported by spindles 3a and 3b, respectively, via bearings and are rotated by driving forces transmitted to sprockets 12a and 12b integral with the supports (through endless chains). Alternatively, any of various other mechanisms, e.g., V-belt transmission, may be used for power transmission to rotating supports 11a and 11b.

The material fed to the raw material inlet A is held between screens 2a and 2b and is gradually squeezed as screens 2a and 2b revolve, with its water content flowing out through the screens to their back side. The feed is subjected to maximum compression at point B, 180 degrees apart from the inlet, and then the spacing between screens 2a and 2b increases gradually, and a dewatered cake is discharged along a scraper 2013. In this way, a xanthan gum component in the form of a cake can be recovered.

The rate at which a dispersion of xanthan gum is fed to the V-type disk press is suitably chosen in consideration of the factors including the xanthan gum concentration in the dispersion and the state of precipitation of xanthan gum.

Unlike centrifugal separators that utilize the difference in specific gravity, the V-type disk press of this embodiment depends on compression. The degree of liquid removal can be adjusted with the compression pressure and the speed of screen revolution, whereby the xanthan gum is squeezed to a water content of only 40–50% by weight. Consequently, the cleaning and purifying effect of the hydrophilic organic solvent is improved and the energy load on the ensuing drying step is lessened.

The V-type disk press shown in FIGS. 2 and 3 can squeeze the feed at low speeds of screen revolution, usually in the range of about 1 to 12 rpm (for screens 0.5 to 1.5 m across). Compared with centrifugal separators that run at 500 to 2,000 rpm, it requires far less power for its operation. Another advantage is the higher degree of safety because there is no need of running the press at high speed in the presence of an organic solvent.

Figure 6:
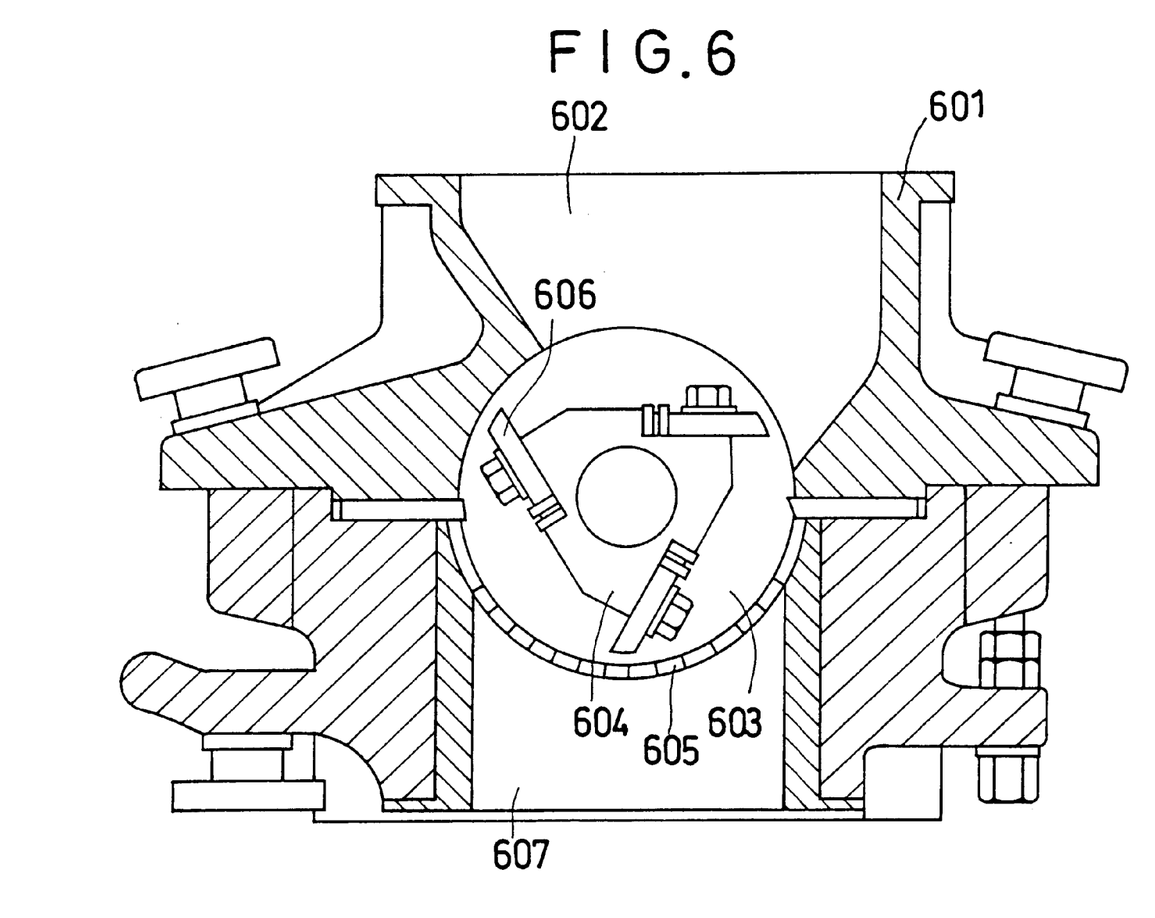
FIG. 6 is a sectional view of a disintegrator for use in the invention.

After the liquid removal step, the cake of xanthan gum is transferred to a disintegrator as shown in FIG. 6, where it is broken up into xanthan gum grains from 0.3 to 2 cm in diameter.

FIG. 6 illustrates a preferred form of the disintegrator.

In FIG. 6, 601 is the main body of the disintegrator, 602 is a hopper, 603 is a treating tank, 604 is a rotary cutter, and 605 is a screen.

Treating tank 603 is built as a cylinder, in which rotary cutter 604 runs. Rotary cutter 604 has three revolving cutter blades 606. The cake of xanthan gum fed at the hopper 602 is broken up into pieces by the cutting blades 606 of rotary cutter 604 in treating tank 603. The pieces disintegrated to a given size or finer are discharged through screen 605 and then through an outlet 607. The size of the resulting xanthan gum grains can be controlled through the adjustment of the mesh size of screen 605. While the embodiment shown uses three revolving cutting blades, the number of blades is not a limitation to this invention. The disintegrated xanthan gum is then sent to a dryer as shown in FIG. 7 for drying.

Figure 7:
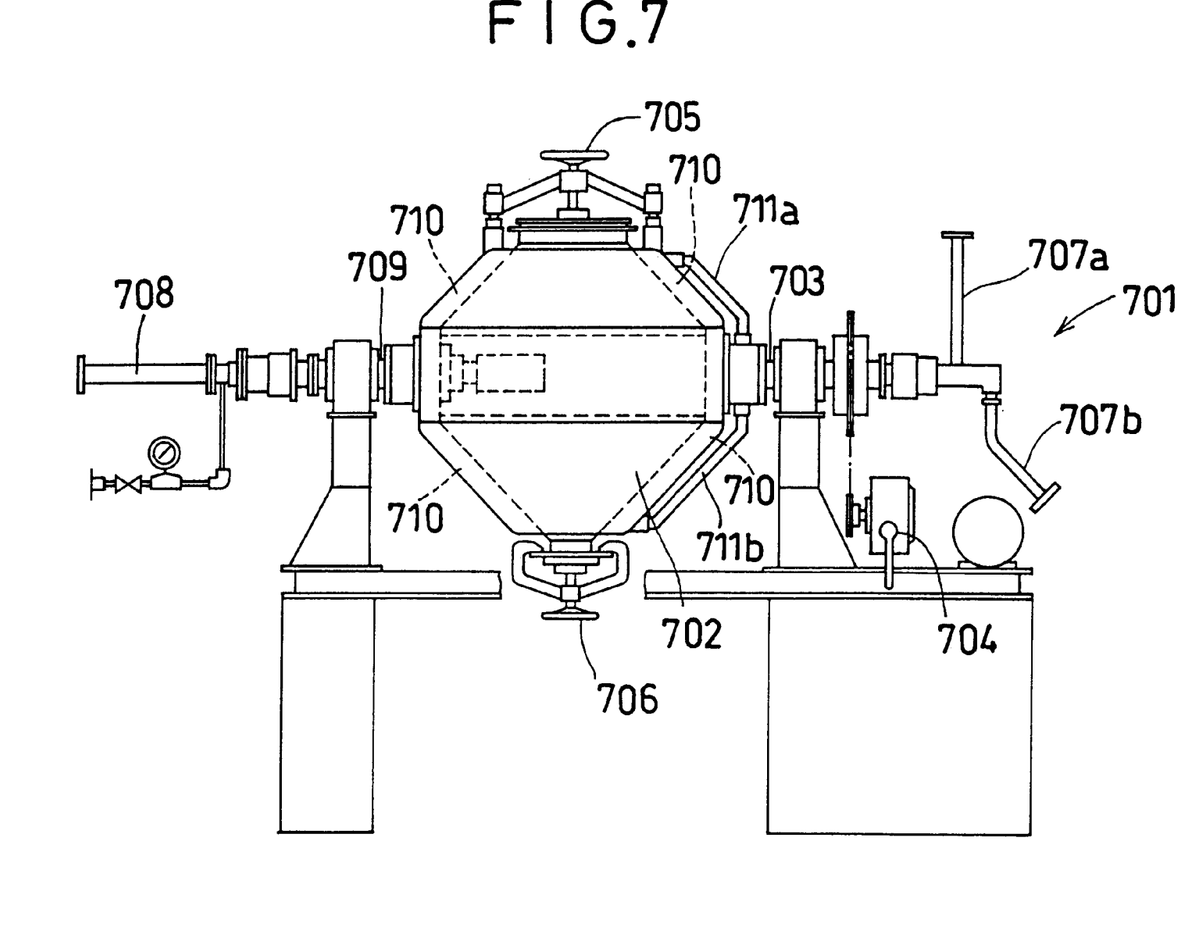
FIG. 7 is a side view of a dryer for use in the invention.

FIG. 7 illustrates a preferred form of the dryer. This dryer 701 is of a type which fluidizes xanthan gum grains during the process of drying, and is set to a drying temperature not exceeding 80° C. Dryer 701 includes a drying drum 702 which is rotated as a rotating shaft 703 is driven. Rotating shaft 703, shown at right, is driven with rotational forces transmitted from a drive motor 704. 705 is an inlet and 706 is an outlet. Hot water enters the dryer 701 from a pipe 707b on the right and flows through a pipe 711b into jackets 710 so as to adjust the temperature of dryer 701. After circulating through jackets 710, the hot water flows out through a pipe 711a and finally through a pipe 707a. The temperature inside the dryer 701 can be regulated by setting the hot water temperature to a desired level.

Vapor-laden air is released under reduced pressure from a vent pipe 708 at the left end. This construction is realized by using a hollow rotating shaft 709 on the left and adopting other means known in the art. The dried xanthan gum is discharged from outlet 706, and it may be ground for easier dispersion in a saline solution. Impact grinding is preferred for that purpose.

Along with the embodiment thus far described, the process of the invention was tested. The results were as follows.

Testing Example 1

A liquid culture medium of the composition I given below was placed in a 2,000-liter fermenter, inoculated with a culture of *Xanthomonas campestris* that had resulted from 24-hour preliminary cultivation, and incubated under aeration and agitation for 2 days, when a fermented solution containing 30 g/l of xanthan gum was obtained.

| Culture medium composition I | |
|---|---|
| Glucose | 58 g/l |
| Polypeptone | 2 g/l |
| KH$_2$PO$_4$ | 2 g/l |
| MgSO$_4$.7H$_2$O | 0.5 g/l |
| Water | 1,300 l |

The fermented solution was heated at 70° C. for 30 minutes to kill the xanthan gum-producing bacteria, and 480 l of the xanthan gum fermented solution and 720 l of aqueous isopropanol (water content: 15 wt %) were poured into a 1,600-liter precipitation tank of the construction described above in conjunction with FIG. 1. The charge was mixed with stirring by an agitation blade (the blade diameter/inside diameter of the tank: 0.86, triangular blade, "Adzita AG type" manufactured by Shimazaki Seisakusho K. K.) that turns reversely after running each quarter of a revolution at high speed within the tank, and xanthan gum was precipitated. The precipitated xanthan gum was in the form of a long cord about 30 to 40 cm in length having a diameter of from about 2 to 3 cm.

The dispersion containing the xanthan gum was fed at a rate of 1,500 liters per hour to a V-type disk press of the construction already described with reference to FIGS. 2 and 3 ("Asahi Press C-35, " mfd. by Asahi Koki K. K., screen mesh size: 0.5 mm) for liquid removal. The liquid content in the product after primary liquid removal was 60% by weight. To 30 kg of the product after primary liquid removal was added one equivalent weight of isopropanol (water content: 15%) in a 500-liter stirred tank. After stirring, the resulting dispersion was fed again to the V-type disk press under the same conditions as described above for liquid removal. The xanthan gum product as a cake after the secondary liquid removal had a liquid content of 45% by weight.

The cake after the secondary liquid removal was broken into small pieces using a disintegrator of the construction explained above in conjunction with FIG. 6. The disintegrated xanthan gum was in the form of grains from 0.6 to 1.5 cm in diameter.

In a 100-liter conical vacuum dryer of the construction illustrated in FIG. 7, 15 kg of the xanthan gum grains was dried at a drying temperature of 40 to 65° C. and a drying pressure of 40 to 100 torr for 3.5 hours. The dry matter was ground to obtain a saline solution-soluble xanthan gum finely divided to 80 mesh or finer particles.

One gram of the xanthan gum thus obtained was placed in a 500 ml-tall beaker, and it was moistened by adding 3 g of 99% ethanol. Next, 196 g of an aqueous solution of 12 wt % sodium chloride kept at 20° C. was added, and the mixture was stirred using an anchor agitator at 1,000 rpm for 2 hours. Thorough dissolution of the xanthan gum and an increase in the viscosity of the aqueous sodium chloride solution were confirmed.

The resulting solution was allowed to stand at 20° C. for one hour, and then its viscosity was measured with a Brookfield BL type viscometer. The viscometer speed was set to 30 rpm and the viscosity was measured with spindle No. 2, when the viscosity (1) was found to be 900 mPa·s. Then, the xanthan gum was dissolved in distilled water to form a solution at a concentration of 0.5 wt %. Its viscosity was measured using a Brookfield BL type viscometer at a speed of 30 rpm, with spindle No. 2. The viscosity (2) was 500 mPa·s.

It was found that, in dissolving the xanthan gum in a saline solution, an agitation speed of 800 rpm or more gives good result. The configuration of the agitation blade is not specially limited; any shape is desirable if it permits the blade to fluidize the entire solution. Dissolution under these conditions produces a solution, which attains a stable viscosity after about 60 minutes of agitation. It was also found that further agitation for 2 to 12 hours causes little change in the viscosity.

Comparative Example 1

One kilogram of xanthan gum grains obtained in the same manner as described in Example 1 was dried in an air-blast dryer above 85° C. for 3.5 hours. It was then ground to an 80 mesh or finer xanthan gum powder. This finely divided xanthan gum was subjected to viscosity measurement by the same method as used in Example 1. The viscosity in saline solution, referred to as (1), was 350 mPa·s, the viscosity in distilled water (none-saline), referred to as (2), was 500 mPa·s, and (1)/(2) was 0.70. In the saline solution, many particles remained undissolved even after 2 hours of agitation. Continued agitation up to 12 hours still failed to dissolve the undissolved particles.

Comparative Examples 2 and 3

The cake of xanthan gum obtained by liquid removal in the manner described in Example 1 was disintegrated using screens with mesh sizes of 2 or 3 cm. Generally in conformity with the procedure of Example 1, the disintegration products were dried until their water contents dropped to 10% or less. Grinding after the drying produced fine xanthan gum powders of 80 mesh or more. These xanthan gum products were subjected to viscosity measurements as in Example 1. The results are shown below.

TABLE 1

| | Mesh Size | Av.Part. Dia. | Drying Time | Drying Pressure | Drying Temp. | Viscosity (1) | (1)/(2) |
|---|---|---|---|---|---|---|---|
| Comp. Ex.2 | 2 cm | 1~2 cm | 5 hrs | 40~100 torr. | 40~80° C. | 800 mPa · s | 1.6 |
| Comp. Ex. 3 | 3 cm | 2~3 cm | 10 hrs | 40~100 torr. | 40~80° C. | 500 mPa · s | 1.0 |

Comparative Example 4

A xanthan gum precipitate obtained similarly to Example 1 was dried without prior liquid removal or disintegration. The dried precipitate was ground to a fine xanthan gum powder 80 mesh or finer in size. This xanthan gum was measured for its viscosity in the manner described in Example 1. The results are given below.

TABLE 2

| | Mesh Size | Drying Time | Drying Pressure | Drying Temp | Viscosity | (1)/(2) |
|---|---|---|---|---|---|---|
| Comp. Ex. 4 | — | 20 hrs | 40~100 torr. | 40~90° C. | 300 mPa · s | 0.6 |

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for recovering a polysaccharide from an aqueous solution thereof, the apparatus consisting essentially of:
   (a) precipitating means comprising a tank and mixer therein and having means for introducing the aqueous solution of polysaccharide and a hydrophilic nonsolvent for the polysaccharide thereto and means for removing a mixture of liquid and precipitated polysaccharide therefrom;
   (b) cake-producing means for receiving precipitated polysaccharide and liquid mixture from the mixing means and for reducing the liquid content of the mixture from the mixing means and for reducing the liquid content of the mixture to no more than 50% by weight to produce a cake of the polysaccharide;
   (c) disintegrating means for receiving the polysaccharide cake from the cake-producing means and disintegrating the polysaccharide cake into particles having a size from 0.3 to 2 cm in diameter; and
   (d) driving means for receiving the particles produced by the disintegrating means and driving the particles at a temperature of no more than 80° C.;
   wherein the cake-producing means is a V-type press having opposing disk-shaped screens fixed to rotatable supports to create a space of variable width therebetween, having a raw material inlet at the point where the space is the widest, the space being the narrowest 180 degrees opposite the inlet, the screens being divided into six segments, each segment having a metal plate with a plurality of openings spaced evenly throughout the segment, means for rotating the supports and screens, means for regulating the width of the space between the screens such that when material having moisture therein is fed to the inlet, it is gradually moved by the rotation of the screens to the narrowest width thereby squeezing the moisture in the material therefrom to form a cake, and scraper means for removing the cake from the screen.

* * * * *